UNITED STATES PATENT OFFICE

2,267,871

MOTHPROOFING COMPOSITIONS AND THEIR MANUFACTURE

Henry Martin, Basel, and Hans Heinrich Zaeslin, Riehen, near Basel, Switzerland, assignors to the firm J. R. Geigy S. A., Basel, Switzerland No Drawing. Application April 21, 1939, Serial No. 269,216. In Switzerland January 13, 1937

7 Claims. (Cl. 260—248)

This application is a continuation in part of our application Ser. No. 184,274, filed January 10, 1938.

We have found that colorless condensation products derived from cyanuric halides by substituting for their halogen atoms 2 or 3 organic radicals whereof at the most 2 may be identical, are particularly suitable for the protection of wool, hair, fur, feathers and the like against moths and other insect pests. For the reaction with the cyanuric halides there may be used aliphatic, araliphatic or aromatic compounds of the benzene series, containing one exchangeable hydrogen atom adapted to react with a halogen atom of the cyanuric trichloride but no auxochromic group or other groups which would impart color to the condensation product. It is preferable that at least one of the used organic compounds contains a radical of an aminodiphenylether.

Moreover it is a condition for the final product that it contains at least one halogen atom and at least one sulphonic acid group; both these substituents may already be present in the compounds that react or may be introduced afterwards into the condensation product obtained from the cyanuric halide and the compounds with reactive hydrogen. But also halogenated and/or sulphonated condensation products may be further treated with halogenating and/or sulphonating agents to raise the halogen contents or to improve the water-solubility.

One halogen atom of the cyanuric compound may also be retained or exchanged for an inorganic residue such as —NH$_2$ or —OH.

These condensation products may be obtained according to known processes (see for example Chem. Centralblatt 1925, II, pages 775–781), by causing for example cyanuric trichloride to react in presence of an agent that binds hydrogen halide such as sodium acetate or alkali carbonate with the compound having reactive hydrogen, for example an amine, a phenol, an alcohol or a mercaptan.

To obtain a particularly good effect, it is preferable to use halogen-substituted and/or alkylated aromatic amines, also sulphamides, substituted phenols and mercaptans.

The new compounds are capable, when applied according to dyeing processes, of protecting wool against moths and like insect pests.

The following examples illustrate the invention:

EXAMPLE 1

1 molecule of cyanuric trichloride is condensed with 1 molecule of 2-amino-4:4'-dichloro-1:1'-diphenyl-ether-2'-sulphonic acid (obtained by sulphonation of the 2-amino-4:4'-dichlorodiphenylether), 1 molecule of 3:4-dichloraniline and 1 molecule of 1-amino-3:4'-dichlorobenzene-6-sulphonic acid. A quantity of the condensation product thus obtained corresponding with 3 per cent of the goods to be treated is dissolved in water (bath concentration 1:40) and mixed with 4 per cent of sulphuric acid and 10 per cent of Glauber's salt, both calculated on the goods to be treated, whereupon loose wool or textiles of animal fibres are impregnated in this solution while boiling during one hour. Finally the goods are rinsed and worked up in the usual manner. They have thus become moth-proof.

In the above example there can also be used with a similar result the condensation products mentioned in the following table:

*Condensation product of 1 molecule of cyanuric trichloride with—*

| No. | 1 mol. of— | 1 mol. of— | 1 mol. of— |
|---|---|---|---|
| 2 | 2:4-dichlorophenol-6-sulphonic acid | NaOH | 4-amino-4'-chloro-3' - 5' -dimethyl - 1:1'-diphenylether-2-sulphonic acid. |
| 3 | 4-amino - 4' - chloro - or - bromo - 1:1' -diphenyl-ether-2-sulphonic acid | 2:4-dichloro-phenol-6-sulphonic acid | 1-amino-2:4-dichlorobenzene-5-sulphonic acid |
| 4 | 4-amino-4'-chloro-1:1'-diphenylether-2-sulphonic acid | 3:4-dichloraniline | 1-amino-3:4-dichlorobenzene-6-sulphonic acid. |
| 5 | 3:4-dichlorophenol-6-sulphonic acid | NH$_3$ | 4 - amino - 4' - chloro - 5' - methyl - 1:1' - diphynylether-2-sulphonic acid. |
| 6 | 2 - amino - 3' - methyl - 4' - chloro - 1:1' - diphenylether-4-sulphonic acid | 3:4-dichloraniline or 4-bromaniline | Do. |
| 7 | 2-amino-4-sulpho-4'-chlorodiphenyl-sulphide | do | Do. |
| 8 | 4 - amino - 3' - methyl - 4' - chloro - 1:1' - diphenylether-2-sulphonic acid | 4-amino - 4' - chloro - 1:1' - diphenyl-ether-2-sulphonic acid | 4-chlorobenzene-sulphamide. |
| 9 | do | do | 3:4-dichlorobenzene-sulphamide. |
| 10 | do | do | Unchanged or HO-R (the R representing hydrogen or alkyl such as CN$_3$, C$_2$H$_5$ etc.). |
| 11 | Bromo- or chloro-xylylether of 4-aminophenol-2-sulphonic acid, prepared from halogenated crude xylenol. | do | 1-amino-3:4-dichlorobenzene-6-sulphonic acid. |

Condensation product of 1 molecule of cyanuric trichloride with—

| No. | 1 mol. of— | 1 mol. of— | 1 mol. of— |
|---|---|---|---|
| 12 | 3:4-dichlorophenol-6-sulphonic acid | NaOH | 4-amino-4'-chloro-5'-methyl-1:1'-diphenyl-ether-2-sulphonic acid. |
| 13 | 3:4:6-trichlorophenol-2-sulphonic acid | Aniline | Do. |
| 14 | do | Meta-chloraniline | Do. |
| 15 | 2:4-dichlorophenol-6-sulphonic acid | 3:4-dichloraniline | 2-amino-4:4'-dichloro-1-1'-diphenylether-2'-sulphonic acid. |
| 16 | 1-amino-3:4-dichlorobenzene-6-sulphonic acid | do | Do. |
| 17 | do | do | 4-amino-2':4':5'-trichloro-1:1'-diphenylether-2-sulphonic acid. |
| 18 | 3:4-dichloraniline | NaOC₂H₅ | 2-amino-2':4':5'-trichloro-1:1'-diphenyleter-4-sulphonic acid. |
| 19 | do | Dimethylamine | 4-amino-4'-chloro-1:1-diphenylether-2-sulphonic acid. |
| 20 | 3:4:5-trichloraniline | NaOCH₃ | Do. |
| 21 | do | NH₃ | 2-amino-4:4'-dichloro-1:1'-diphenylether-2'-sulphonic acid. |
| 22 | do | NaOH | Do. |
| 23 | do | 2-amino-4:4'-dichloro-1:1'-diphenyl-ether-2'-sulphonic acid | Do. |
| 25 | 3:4-dichloraniline | NH₃ | Unchanged. |
| 26 | do |  | 2-amino-4:4'-dichloro-1:1'-diphenylether-2'-sulphonic acid. |
| 27 | 3:4:5-trichloraniline | NaOH | Do. |
| 28 | Aniline | 3:4:6-trichlorophenol-2-sulphonic acid | Do. |
| 29 | 3:4:5-trichloraniline | do | Do. |
| 30 | 4-chloraniline | 3:5-dimethyl-4-chlorophenol-2-sulphonic acid | Do. |
| 31 | 3:4:5-trichloraniline | do | Do. |
| 32 | 4-amino-2:4'-dichloro-5'-methyl-1:1'-diphenyl-ether-2'-sulphonic acid | H.N(CH₃)(CH₃) | 4-amino-2:4'-dichloro-5'-methyl-1:1'-diphenyl-ether-2'-sulphonic acid. |
| 33 | 3-methyl-4-chlorophenol-6-sulphonic acid | NaOH | 4-amino-3':5'-dimethyl-4'-chloro-1:1'-diphenyl-ether-2-sulphonic acid. |
| 34 | NaOCH₃ | 4-chloro-4'-amino-1:1'-diphenyl-ether-2'-sulphonic acid | 4-chloro-4'-amino-1:1'-diphenylether-2'-sulphonic acid. |
| 35 | NaOH | do | Do. |
| 36 | NaOCH₃ | 2':4-dichloro-5-methyl-4'-amino-1:1'-diphenylether-2-sulphonic acid | 2':4-dichloro-5-methyl-4'-amino-1:1'-diphenyl-ether-2-sulphonic acid. |
| 37 | 3:4-dichloraniline | 4'-chloro-2-amino-1:1'-diphenylether-4-sulphonic acid | 4'-chloro-2-amino-1:1'-diphenylether-4-sulphonic acid. |
| 39 | NaOH | 4'-chloro-3'-methyl-4-amino-1:1'-diphenylether-2-sulphonic acid | 4'-chloro-3'-methyl-4-amino-1:1'-diphenylether-2-sulphonic acid. |
| 40 | Unchanged or NaOC₂H₅ | 4'-chloro-4-amino-1:1'-diphenylether-2-sulphonic acid | 4'-chloro-4-amino-1:1'-diphenylether-2-sulphonic acid. |
| 41 | 3:4-dichloraniline | 3:4-dichloraniline | 4'-chloro-2-amino-1:1'-diphenylsulphide-4-sulphonic acid. |
| 42 | NaOH | 4'-chloro-4-amino-3':5'-dimethyl-1:1'-diphenylether-2-sulphonic acid | 4'-chloro-4-amino-3':5'-dimethyl-1:1'-diphenyl-ether-2-sulphonic acid. |
| 43 | 3:4:5-trichloraniline | NaOCH₃ | 4'-chloro-4-amino-1:1'-diphenylether-2-sulphonic acid. |
| 44 | 3:4-dichloraniline | 3:4-dichloraniline | 4'-chloro-4-amino-3'-methyl-1:1'-diphenylether-2-sulphonic acid. |
| 45 | 3:4:5-trichloraniline | 3:4:5-trichloraniline | Do. |
| 46 | NaOH | 4:4'-dichloro-2-amino-1:1'-diphenylether-2'-sulphonic acid | 4'-chloro-4-amino-3'-methyl-1:1'-diphenylether-2-sulphonic acid. |
| 47 | 3:4-dichloraniline | NaOCH₃ | 2:4'-dichloro-3':5'-dimethyl-4-amino-1:1'-diphenylether-2'-sulphonic acid. |
| 48 | Sodium-n-propylate | 2-amino-4:4'-dichloro-1:1'-diphenylether-2'-sulphonic acid | 2-amino-4:4'-dichloro-1:1'-diphenylether-2'-sulphonic acid. |
| 49 | Sodium-isopropylate | 2-amino-4:4'-dichloro-1:1'-diphenylether-2'-sulphonic acid | Do. |
| 50 | Sodium-n-butylate | do | Do. |
| 51 | Sodium-isobutylate | do | Do. |
| 52 | Sodium-isoamylate | do | Do. |
| 53 | NaOH | 2:4':5'-trichloro-4-amino-1:1'-diphenylether-2'-sulphonic acid | 2:4':5'-trichloro-4-amino-1:1'-diphenyl-ether-2'-sulphonic acid. |
| 54 | do | 2:4-dichlorophenol-6-sulphonic acid | 4'-chloro-5'-methyl-4-amino-1:1'-diphenylether-2-sulphonic acid. |
| 55 | do | 4'-chloro-4-amino-1:1'-diphenylether-2-sulphonic acid | 4:4'-dichloro-2-amino-1:1'-diphenylether-2'-sulphonic acid. |
| 56 | NaOCH₃ | 4:4'-dichlorophenol-6-sulphonic acid | 4'-chloro-4-amino-1:1'-diphenylether-2-sulphonic acid. |
| 57 | NH₃ | do | Do. |
| 58 | Dimethylamine | do | Do. |
| 59 | 4-chloraniline | do | Do. |
| 60 | 3:4-dichloraniline | do | 4:4'-dichloro-2-amino-1:1'-diphenylether-2'-sulphonic acid. |
| 61 | 3:4:5-trichloraniline | do | Do. |
| 62 | 2:4:5-trichloraniline | do | Do. |
| 63 | NaOCH₃ | 4'-methyl-4-amino-1:1'-diphenyl-ether-2-sulphonic acid | 4'-chloro-4-amino-1:1'-diphenylether-2-sulphonic acid. |
| 64 | NaOH | 3:4-dichloraniline | 4:4':5-trichloro-5'-methyl-2-amino-1:1'-diphenyl-ether-2'sulphonic acid. |
| 65 | do | 4'-chloro-4-amino-1:1'-diphenylether-2-sulphonic acid | 4'-chloro-4-amino-1:1'-diphenylsulphone-2-sulphonic acid. |

The succession of use of the components in the preparation of the condensation products is not limited by the above indication. By experiments it is easy to determine the best manner of proceeding. As example the following mode of preparation may be given:

Into 9.3 parts by weight of finely divided cyanuric trichloride obtained for example by pouring a solution thereof in 50 parts of acetone into 200 parts of water, there is introduced drop by drop at 0° C., while well stirring, a solution of 22 parts of 2-amino-4:4'-dichloro-1:1'-diphenylether-2'-sulphonic acid in 200 parts of water.

The stirring is continued until all the cyanuric trichloride has disappeared, which will be the case after about half an hour. At the same time the liberated hydrochloric acid is neutralised by means of the necessary quantity of sodium carbonate. Thereupon, a solution of 8.1 parts of 3:4-dichloraniline in 70 parts of acetone is introduced drop by drop at 30–40° C. Then the mass is stirred for ½ to 1 hour while gradually neutralising by means of a sodium carbonate solution the mineral acid produced, the total consumption of sodium carbonate being the theoretically necessary quantity. Thereafter the temperature is raised to 85–90° C. and a solution of 14.5 parts of 1-amino-3:4-dichlorobenzene-6-sulphonic acid of 83 per cent strength in 200 parts of water and the necessary quantity of sodium carbonate is slowly added.

The mixture is stirred until the reaction is achieved, the progress of the operation being followed or observed through the course of neutralising the liberated hydrochloric acid by means of sodium carbonate. Finally the mass is allowed to cool whereupon the condensation product separates; it is filtered by suction and dried. The condensation product constitutes, after mechanical reduction or milling, a colorless to nearly colorless powder which is clearly soluble in water.

EXAMPLE 2

*(Sulphonation of an insoluble condensation product)*

15 parts of the condensation product made from 1 mol. cyanuric chloride, 2 mol. of 4:4'-dichloro-2-amino-1:1'-diphenylether and 1 mol. of NaOH are added in portions while stirring to 150 parts of sulphuric acid monohydrate and the whole is heated to 60° C., till a test portion is soluble in dilute sodium carbonate solution. This is the case after about ½ hour. The whole is poured on ice, the sulphonic acid is salted out, filtered with suction and dried.

EXAMPLE 3

*(Halogenation of condensation products)*

(a) 32.6 parts of the condensation product, obtained by condensing 1 mol. of cyanuric chloride with 2 mol. of 3'-methyl-4-amino-1:1'-diphenylether-2-sulphonic acid and 1 mol. of NaOH are dissolved in 400 parts by volume of glacial acetic acid and 200 parts by volume of conc. hydrochloric acid and 100 parts of a solution of 10 per cent strength of sodium chlorate dropped in at 45° C. during 5 hours. The increasing precipitation is finally completed by the addition of 1000 parts of water. When filtered with suction and dried, the new product, a bright powder, is soluble in water, but more easily soluble in dilute solution of sodium carbonate. Its chlorine content is about 20 per cent.

(b) 16.3 parts of the condensation product of Example 3a are dissolved with the calculated amount of sodium carbonate in 400 parts of water; this solution is treated at 30–40° C. with chlorine gas for 2 hours. By adding dilute sodalye in drops, the reaction is kept slightly alkaline to litmus. Finally the chlorinated compound is precipitated by the addition of a mineral acid. Chlorine content 8.5 per cent.

By a chlorination of 6 hours a chlorine content of 16.3 percent is obtained.

(c) 14 parts of a condensation product made from 1 mol. of cyanuric chloride, 1 mol. of sodium methylate, 1 mol. of 4-amino-1:1'-diphenylether-2-sulphonic acid and 1 mol. of 3'-methyl-4-amino-1:1'-diphenylether-2-sulphonic acid are dissolved in 500 parts of water and chlorine is passed into the solution for 3 hours at 20–30° C. The free acid of the chlorinated product separates in the form of slightly yellow crumbs. It is soluble in water, more easily in dilute sodium carbonate solution. Chlorine contents 24.1 per cent or about 6 atoms.

Similar halogenated products are obtained by interrupting the chlorination after some time, for example after 2 hours and halogenating further in glacial acetic acid or in a solution in chloroform with the calculated amount of bromine.

The above enumerated reaction-compounds, in so far as they are new, are made according to known methods, for example the aminodiphenylether of No. 2 in the third column of the preceding table, according to the following equation:

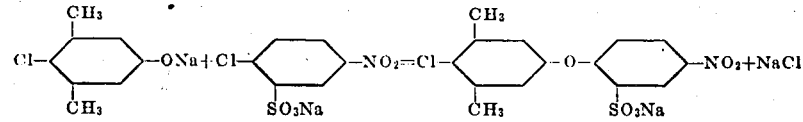

and by reduction of the nitro-group according to Béchamp (see for example German Patent 156,156 or U. S. Patent 1,042,198).

The diphenylether sulphonic acid of No. 14 of the table may be made by sulphonation of 2-amino-4:4'-dichloro-1:1'-diphenylether with conc. sulphuric acid at 100° C.

The diphenylsulphide-sulphonic acid of No. 41 of the table may be made in a manner analogous to the formation of diphenylether sulphonic acids with phenyl-mercaptans instead of phenols according to the equation:

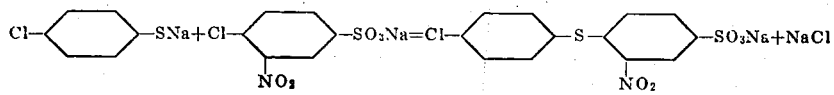

and by usual reduction of the nitro-group.

The diphenylsulphone-sulphonic acid of No. 65 of the table can be made in known manner (alkali-salts of aromatic sulphonic acids reacted with aromatic nitro-compounds containing exchangeable halogen) according to the equation:

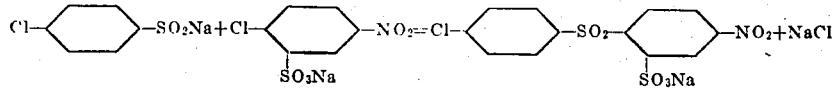

and by usual reduction of the nitro-group.

By compounds of the benzene series applicants mean in the following any colourless compound which contains at least one benzene nucle-

What we claim is:

1. Moth-proofing compositions containing as their essential active ingredient a compound of the general formula

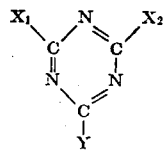

wherein $X_1$ and $X_2$ represent two radicals of the benzene series, and wherein Y represents a radical selected from the group consisting of aliphatic amines and aromatic amines of the benzene series, of mercaptans of the benzene series and of monohydric compounds of the formula ROH, R being one of the group consisting of H, alkyl and phenyl, the three radicals $X_1$, $X_2$ and Y being connected each by one of the group consisting of O, N and S with the cyanuric nucleus, and the benzene nuclei of $X_1$, $X_2$ and Y containing substituents selected from the group consisting of H, Br, Cl, phenoxy, chlorophenoxy, alkylphenoxy, phenylthio, chlorophenylthio and alkyl, at least one of the three radicals $X_1$, $X_2$ and Y bearing at least one sulphonic acid group and at least one halogen atom, and at least one of the three radicals $X_1$, $X_2$ and Y being an aminodiphenylether radical, the compositions being colorless to nearly colorless powders which are soluble in water and very efficacious in protecting wool, hair, fur, feathers and the like against moths and other insect pests.

2. Moth-proofing compositions containing as their essential active ingredient a compound of the general formula

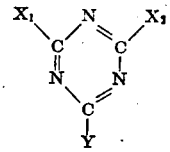

wherein $X_1$ and $X_2$ represent two identical radicals of the benzene series, and wherein Y represents a radical selected from the group consisting of aliphatic amines and aromatic amines of the benzene series, of mercaptans of the benzene series and of monohydric compounds of the formula ROH, R being one of the group consisting of H, alkyl and phenyl, the three radicals $X_1$, $X_2$ and Y being connected each by one of the group consisting of O, N and S with the cyanuric nucleus, and the benzene nuclei of $X_1$, $X_2$ and Y containing substituents selected from the group consisting of H, Br, Cl, phenoxy, chlorophenoxy, alkylphenoxy, phenylthio, chlorophenylthio and alkyl, at least one of the three radicals $X_1$, $X_2$ and Y bearing at least one sulphonic acid group and at least one halogen atom, and at least one of the three radicals $X_1$, $X_2$ and Y being an aminodiphenylether radical, the compositions being colorless to nearly colorless powders which are soluble in water and very efficacious in protecting wool, hair, fur, feathers and the like against moths and other insect pests.

3. Moth-proofing compositions containing as their essential active ingredient a compound of the general formula

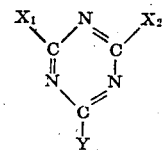

wherein $X_1$ and $X_2$ represent two radicals of aminodiphenylethers and Y represents a radical selected from the group consisting of aliphatic amines and aromatic amines of the benzene series, of mercaptans of the benzene series and of monohydric compounds of the formula ROH, R being one of the group consisting of H, alkyl and phenyl, the two radicals $X_1$, $X_2$ being connected by N and the radical Y by one of the group consisting of O, N and S with the cyanuric nucleus, and the benzene nuclei of $X_1$, $X_2$ and Y containing substituents selected from the group consisting of H, Br, Cl, phenoxy, chlorophenoxy, alkylphenoxy, phenylthio, chlorophenylthio and alkyl, at least one of the three radicals $X_1$, $X_2$ and Y bearing at least one sulphonic acid group and at least one halogen atom, the compositions being colorless to nearly colorless powders which are soluble in water and very efficacious in protecting wool, hair, fur, feathers and the like against moths and other insect pests.

4. Moth-proofing compositions containing as their essential active ingredient a compound of the general formula

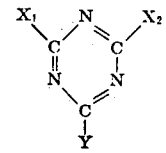

wherein $X_1$ and $X_2$ represent the radicals of the same amino-diphenylether and Y represent a radical selected from the group consisting of aliphatic amines and aromatic amines of the benzene series, of mercaptans of the benzene series and of monohydric compounds of the formula ROH, R being one of the group consisting of H, alkyl and phenyl, the radicals $X_1$, $X_2$ being connected by N and the radical Y by one of the group consisting of O, N and S with the cyanuric nucleus, and the benzene nuclei of $X_1$, $X_2$ and Y containing substituents selected from the group consisting of H, Br, Cl, phenoxy, chlorophenoxy, alkylphenoxy, phenylthio, chlorophenylthio and alkyl, at least one of the three radicals $X_1$, $X_2$ and Y bearing at least one sulphonic acid group and at least one halogen atom, the compositions being colorless to nearly colorless powders which are soluble in water and very efficacious in protecting wool, hair, fur, feathers and the like against moths and other insect pests.

5. A moth-proofing compound corresponding in the free state to the probable formula:

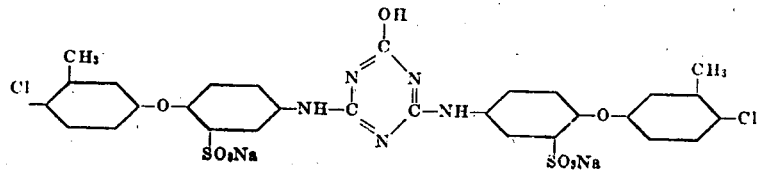

the compound being a colorless to nearly colorless powder which is soluble in water and is very efficacious in protecting wool, hair, fur, feathers and the like against moths and other insect pests.

6. A moth-proofing compound corresponding in the free state to the probable formula:

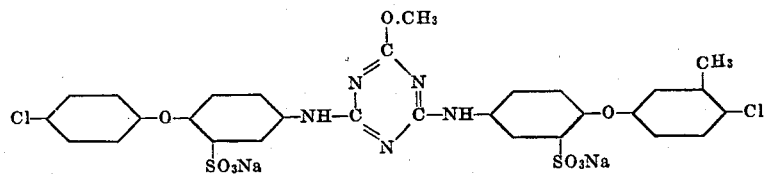

the compound being a colorless to nearly colorless powder which is soluble in water and is very efficacious in protecting wool, hair, fur, feathers and the like against moths and other insect pests.

7. A moth-proofing compound corresponding in the free state to the probable formula:

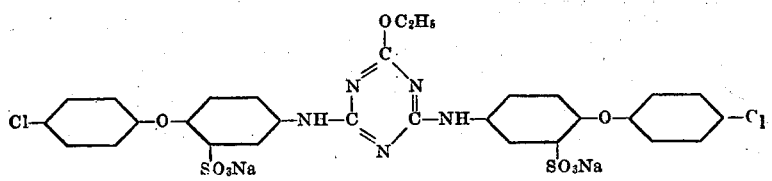

the compound being a colorless to nearly colorless powder which is soluble in water and is very efficacious in protecting wool, hair, fur, feathers and the like against moths and other insect pests.

HENRY MARTIN.
HANS HEINRICH ZAESLIN.